United States Patent Office 2,899,354
Patented Aug. 11, 1959

2,899,354

DECYLTHIOACETIC ACID DIETHANOLAMIDE AS FUNGICIDAL AGENT

Alois Kleemann, Basel, and Jakob Bindler, Riehen, near Basel, Switzerland, assignors to J. R. Geigy A.-G., Basel, Switzerland, a Swiss firm No Drawing. Application May 7, 1956
Serial No. 582,950

Claims priority, application Switzerland May 5, 1955

1 Claim. (Cl. 167—22)

The present invention concerns antiparasitic agents and their use for the control of parasites which cause damage by attacking plants.

It has surprisingly been found that the diethanolamide of the formula

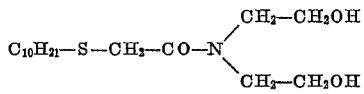

has a strong fungistatic or fungicidal action and is, therefore, very suitable as active ingredient for the preparation of antiparasitic agents.

The ethanolamide used according to the present invention is produced from the corresponding alkanolamide and carboxylic acid $C_{10}H_{21}$—S—$CH_2$—COOH or the reactive functional derivatives thereof.

The compound usable according to the present invention dissolves very well in mineral oil.

The fungicidal properties of the active ingredient defined above can be put to use in the most various manners. For example, it can serve to protect living plants as well as harvested fruits, roots, bulbs and other parts of plants from the attack of fungi.

If the diethanolamide defined above is to be used for the control of injurious fungi, on the surface of substrata of all kinds, it must be applied in a finely distributable form. This, in some cases, is facilitated by its own emulsifying action. To produce such products, the diethanolamides is mixed with suitable solvents and/or distributing agents, if desired with the addition of other fungicidal, bactericidal and insecticidal substances. For example, the active ingredient is combined with talc, kaolin, bole, bentonite, chalk or ground limestone to obtain dusts. Such agents can be made suspendable in water by the addition of wetting agents and then used as wettable powder. By combining the active ingredient with solvents or liquid distributing agents, e.g. aliphatic or aromatic hydrocarbons or chlorinated hydrocarbons, if necessary with the addition of auxiliary solvents such as acetone or higher ketones such as cyclohexanone, sprays are obtained. Such solutions or mixtures can be used, however, direct or after addition of emulsifiers as concentrates for the preparation of aqueous emulsions. Also the active ingredient can be used in the form of aerosols or smokes.

The following examples serve to illustrate further the invention without limiting it in any way. In the examples, parts are given as parts by weight.

Example 1.—Spray 10 parts of decylthio-acetic acid diethanolamide are ground with 85 parts of kaolin (or another suitable carrier) and 5 parts of pulverulent sulphite waste liquor (as dispersing agent). A powder is obtained which, diluted with water, produces a suspension with a fungicidal action which is suitable for spraying plants attacked by, e.g. Alternaria tenuis, Botrytis cinerea, Coniothyrium diplodiella or Monilia cinerea.

Example 2.—Spray 50 parts of decylthio-acetic acid diethanolamide are dissolved in 10 parts of ethyl alcohol and 40 parts of water. A clear solution results which, diluted with further water, produces opalescent spraying liquors which can be used as described in Example 1.

What we claim is:

An agent for the control of fungi comprising as an active ingredient decylthioacetic acid diethanolamide in a fungicidal amount, and a fungicide adjuvant as a carrier therefor.

References Cited in the file of this patent

UNITED STATES PATENTS

| | | |
|---|---|---|
| 2,520,551 | Kilgore | Aug. 29, 1950 |
| 2,541,930 | Martin et al. | Feb. 13, 1951 |
| 2,704,280 | Trowbridge | Mar. 15, 1955 |

OTHER REFERENCES

Coan et al.: Jour. of Am. Chem. Soc., vol. 77, No. 9, May 5, 1955, pp. 2402–2404.